(12) United States Patent
Wu

(10) Patent No.: US 12,543,136 B2
(45) Date of Patent: Feb. 3, 2026

(54) MEASUREMENT METHOD, TERMINAL DEVICE, AND NETWORK SIDE DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 649 days.

(21) Appl. No.: 17/948,201

(22) Filed: Sep. 19, 2022

(65) Prior Publication Data

US 2023/0019838 A1 Jan. 19, 2023

Related U.S. Application Data

(63) Continuation of application No. PCT/CN2021/082282, filed on Mar. 23, 2021.

(30) Foreign Application Priority Data

Mar. 24, 2020 (CN) .......................... 202010215189.1

(51) Int. Cl.
*H04W 56/00* (2009.01)

(52) U.S. Cl.
CPC ................... *H04W 56/0065* (2013.01)

(58) Field of Classification Search
CPC ................................................ H04W 56/0065
See application file for complete search history.

(56) References Cited

U.S. PATENT DOCUMENTS

| 6,628,630 B1 * | 9/2003 | Nagase ............. H04W 36/0083 |
| | | 455/436 |
| 2019/0215711 A1 * | 7/2019 | Tsai ...................... H04B 17/309 |
| 2019/0273637 A1 * | 9/2019 | Zhang .................... H04L 5/0051 |
| 2019/0313272 A1 | 10/2019 | Zhou et al. |
| 2020/0359251 A1 * | 11/2020 | Gunnarsson .......... H04W 24/10 |

(Continued)

FOREIGN PATENT DOCUMENTS

| CN | 109391390 A | 2/2019 |
| CN | 110419235 A | 11/2019 |
| WO | 2019167844 A1 | 9/2019 |

OTHER PUBLICATIONS

Extended European Search Report issued in related European Application No. 21776009.9, mailed Aug. 22, 2023, 9 pages.

(Continued)

*Primary Examiner* — Jamaal Henson
(74) *Attorney, Agent, or Firm* — IPX PLLC

(57) ABSTRACT

A measurement method, a terminal device, and a network side device are provided. The method includes: in a case that at least two transmission nodes are configured for a first serving frequency of a terminal device, performing system frame number and frame timing difference (SFTD) measurement according to a first measurement parameter to obtain an SFTD measurement result, where the first measurement parameter is used to instruct to perform at least one of the following: measuring an SFTD value between a specific transmission node of the first serving frequency and a first network node, or measuring a timing difference between different specific transmission nodes of the first serving frequency.

16 Claims, 3 Drawing Sheets

(56) References Cited

U.S. PATENT DOCUMENTS

2022/0132527 A1* 4/2022 Cui ................... H04W 56/001
2023/0050521 A1* 2/2023 Manolakos ........... H04W 64/00

OTHER PUBLICATIONS

Apple, "On definition of SFTD measurement", 3GPP Draft, R4-1911431, Oct. 2019, 4 pages.
International Search Report issued in corresponding International Application No. PCT/CN2021/082282, mailed Jun. 15, 2021, 4 pages.
Ericsson, "SFTD measurement for non-serving cell when PSCell is configured", 3GPP TSG-RAN WG2 #101 R2-1803326, Mar. 2018.
3GPP, "Physical layer measurements(Release 15)", 3GPP TS 38.215 V15.4.0, Dec. 2018, 5.1.14.

* cited by examiner

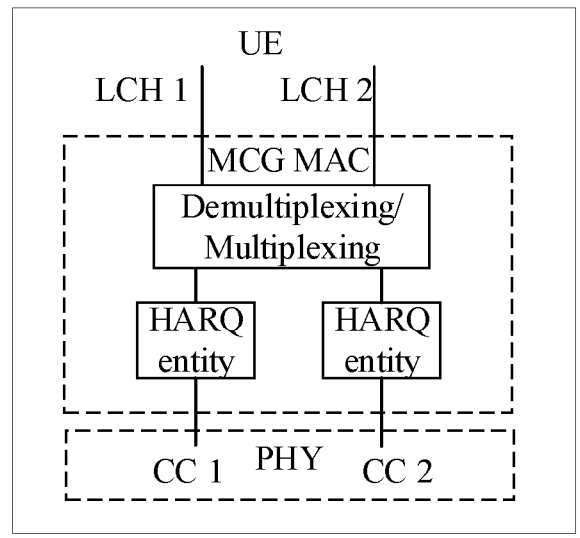
FIG. 1
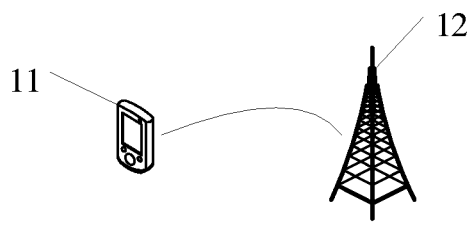
FIG. 2
In a case that at least two transmission nodes are configured for a first serving frequency of a terminal device, perform system frame number and frame timing difference SFTD measurement according to a first measurement parameter to obtain an SFTD measurement result — 301
FIG. 3

MEASUREMENT METHOD, TERMINAL DEVICE, AND NETWORK SIDE DEVICE

CROSS-REFERENCE TO RELATED APPLICATIONS

This application is a continuation of International Application No. PCT/CN2021/082282, filed Mar. 23, 2021, which claims priority to Chinese Patent Application No. 202010215189.1, filed Mar. 24, 2020. The entire contents of each of the above-referenced applications are expressly incorporated herein by reference.

TECHNICAL FIELD

The present disclosure relates to field of communications technologies, and in particular, to a measurement method, a terminal device, and a network side device.

BACKGROUND

In an existing mobile communications system, a network side device may configure User Equipment (UE, may also be referred to as a terminal or a terminal device) to perform System Frame Number and Frame Timing Difference (SFTD) measurement, for example, measure an SFN difference (SFN offset) and a frame boundary difference (Frame boundary offset) between different cells.

However, in the prior art, SFTD measurement is often performed for a case that transmission signals of one serving cell or Bandwidth Part (BWP) of the UE are usually from one transmission node (Transmission Point, TRP). There is no related solution for performing SFTD measurement in a case that transmission signals of one serving cell or BWP of the UE are from a plurality of transmission nodes.

SUMMARY

Embodiments of the present disclosure provide a measurement method, a terminal device, and a network side device.

According to a first aspect, an embodiment of the present disclosure provides a measurement method. The method is performed by a terminal device and includes:

in a case that at least two transmission nodes are configured for a first serving frequency of the terminal device, performing system frame number and frame timing difference SFTD measurement according to a first measurement parameter to obtain an SFTD measurement result, where the first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

According to a second aspect, an embodiment of the present disclosure further provides a measurement method. The method is performed by a network side device and includes:

in a case that at least two transmission nodes are configured for a first serving frequency of a terminal device, sending a first measurement parameter to the terminal device, where the first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

According to a third aspect, an embodiment of the present disclosure further provides a terminal device. The terminal device includes:

a measurement module, configured to: in a case that at least two transmission nodes are configured for a first serving frequency of the terminal device, perform system frame number and frame timing difference SFTD measurement according to a first measurement parameter to obtain an SFTD measurement result, where the first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

According to a fourth aspect, an embodiment of the present disclosure further provides a network side device. The network side device includes:

a sending module, configured to: in a case that at least two transmission nodes are configured for a first serving frequency of a terminal device, send a first measurement parameter to the terminal device, where the first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency is a serving frequency other than the first serving frequency in at least two serving frequencies of the terminal device; and both the SFTD value and the timing difference include at least one of a system frame number difference or a frame boundary difference.

According to a fifth aspect, an embodiment of the present disclosure further provide a terminal device, including a processor, a memory, and a computer program that is stored in the memory and that can be run on the processor, where when the computer program is executed by the processor, the steps of the measurement method provided in the first aspect are implemented.

According to a sixth aspect, an embodiment of the present disclosure further provide a network side device, including a processor, a memory, and a computer program that is stored in the memory and that can be run on the processor, where when the computer program is executed by the processor, the steps of the measurement method provided in the second aspect are implemented.

According to a seventh aspect, an embodiment of the present disclosure further provides a computer-readable storage medium, where the computer-readable storage medium stores a computer program, and when the computer program is executed by a processor, the steps of the measurement method provided in the first aspect or the steps of the measurement method provided in the second aspect are implemented.

In the embodiments of the present disclosure, in a case that at least two transmission nodes are configured for a first serving frequency of the terminal device, SFTD measurement is performed according to a first measurement parameter to obtain an SFTD measurement result, where the first measurement parameter is used to instruct to perform at least one of the following: measuring an SFTD value between a specific transmission node of the first serving frequency and a first network node, or measuring a timing difference between different specific transmission nodes of the first serving frequency. In a case that transmission signals of one serving cell or BWP of the terminal device are from a plurality of transmission nodes, SFTD measurement is performed at a granularity of a transmission node to obtain a timing difference between transmission nodes, so that accuracy of performing timing difference measurement on different transmission nodes in a same serving cell or BWP can be improved, and a network side can further better understand a timing difference between different transmission nodes in a same cell or BWP.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

FIG. 1 is a schematic architectural diagram of carrier aggregation according to an embodiment of the present disclosure;

FIG. 2 is a structural diagram of a network system to which the embodiments of the present disclosure can be applied;

FIG. 3 is a flowchart of a measurement method according to an embodiment of the present disclosure;

DETAILED DESCRIPTION

Figure 4:
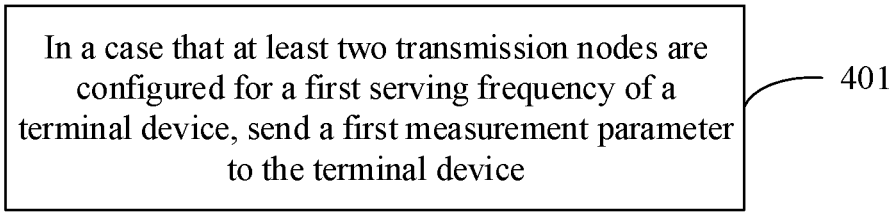
FIG. 4 is a flowchart of another measurement method according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the specification and claims of this application, the terms "first", "second", and the like are intended to distinguish between similar objects but do not necessarily describe a specific order or sequence. It should be understood that the data termed in such a way is interchangeable in proper circumstances so that the embodiments of this application described herein can be implemented, for example, in an order other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in the specification and claims, "and/or" is used to indicate at least one of connected objects, for example, A and/or B and/or C indicate seven cases: only A, only B, only C, A and B, B and C, A and C, and A, B and C.

For ease of understanding, the following describes some content in the embodiments of the present disclosure.

Carrier Aggregation (CA):

User Equipment (UE) may also be referred to as a terminal or a terminal device, and may be configured to work simultaneously on carriers (Component Carrier (CC)) of a plurality of different frequencies (different ARFCNs (Absolute Radio Frequency Channel Number)), where the CA includes one Primary Cell (PCell) and one or more Secondary Cell (SCell). Each carrier is one serving cell configured with a corresponding serving cell identifier, for example, servingCellId, and corresponds to a Hybrid Automatic Repeat Request (HARQ) entity. The HARQ entity includes a plurality of HARQ processes. For example, as shown in FIG. 1, each of two carriers: a CC1 and a CC2 corresponds to one HARQ entity. A configuration of a serving cell includes a common cell configuration applicable to all UEs of the cell and a dedicated cell configuration applicable to the dedicated UE.

Bandwidth Part (BWP):

For a serving cell, a maximum of four BWPs may be configured on a network side, and the four BWPs correspond to different working frequency ranges. The network side may indicate an activated BWP by using Downlink Control Information (DCI) signaling. For a serving cell, the UE can have only one activated BWP at a same moment.

Dual Connectivity (DC):

The UE may establish a connection simultaneously in two cell groups (a Master Cell Group (MCG) and a Secondary Cell Group (SCG)). The MCG includes a PCell and a SCell, and the SCG includes a Primary Secondary Cell (PSCell) and a SCell. Each of the PCell and the PSCell may be referred to as a Special Cell (SpCell).

System Frame Number and Frame Timing Difference (SFTD) Measurement:

In a DC configuration, the network side needs to know an SFN difference (SFN offset) and a frame boundary difference (frame boundary offset) between a PCell and a PSCell, to perform a corresponding DC configuration in a case that differences are different. For example, when a difference is relatively small, synchronous DC is configured, and when a difference is relatively large, asynchronous DC is configured. Therefore, the network side configures the UE to perform SFTD measurement, for example, measuring an SFN difference and a frame boundary difference between different cells.

The SFTD configuration on the network side may include at least one of the following: instructing the UE to measure an SFTD value between the PCell and the PSCell, or instructing the UE to measure an SFTD value between the PCell and a neighboring cell.

The embodiments of the present disclosure provide a measurement method. Referring to FIG. 2, FIG. 2 is a structural diagram of a network system to which the embodiments of the present disclosure can be applied. As shown in FIG. 2, the network system includes a terminal device 11 and a network side device 12. The terminal device 11 may be a user side device such as a mobile phone, a tablet personal computer, a laptop computer, a personal digital assistant, a mobile internet device, or a wearable device. It should be noted that a specific type of the terminal device 11 is not limited in the embodiments of the present disclosure. The network side device 12 may be a base station, for example, a macro base station, an LTE eNB, a 5G NR NB, or a gNB. The network side device 12 may be a small cell, for example, a Low Power Node (LPN) pico or a femto, or the network side device 12 may be an Access Point (AP). The base station may be a network node formed by a Central Unit (CU) and a plurality of TRPs that are managed and controlled by the CU. It should be noted that a specific type of the network side device 12 is not limited in the embodiments of the present disclosure.

An embodiment of the present disclosure provides a measurement method, performed by a terminal device. Referring to FIG. 3, FIG. 3 is a schematic flowchart of a measurement method according to an embodiment of the present disclosure. As shown in FIG. 3, the method includes the following steps.

Step 301: In a case that at least two transmission nodes are configured for a first serving frequency of the terminal device, perform system frame number and frame timing difference SFTD measurement according to a first measurement parameter to obtain an SFTD measurement result.

The first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

In this embodiment, the foregoing serving frequency may include a cell or a BWP of a cell. The first serving frequency may include a first serving cell of the terminal device or a BWP of a first serving cell, where the first serving cell may be any serving cell of the terminal device.

For the neighboring serving frequency of the first serving frequency, in a case that the first serving frequency is the first serving cell, the neighboring serving frequency of the first serving frequency may include at least one of a neighboring cell of the first serving cell or a BWP of the neighboring cell of the first serving cell; or in a case that the first serving frequency is a first BWP of the first serving cell, the neighboring serving frequency of the first serving frequency may include at least one of a BWP other than the first BWP in the first serving cell, a neighboring cell of the first serving cell, or a BWP of the neighboring cell of the first serving cell. The first BWP may be any BWP of the first serving cell.

The third serving frequency may include a serving frequency other than the first serving frequency in serving frequencies of the terminal device. For example, if serving cells of the terminal device include the first serving cell and a second serving cell, and the first serving frequency is the first serving cell, the third serving frequency may include at least one of the second serving cell or a BWP of the second serving cell. If serving cells of the terminal device include the first serving cell and a second serving cell, and the first serving frequency is the first BWP of the first serving cell, the third serving frequency may include at least one of a BWP other than the first BWP in the first serving cell, the second serving cell, or a BWP of the second serving cell. The first BWP may be any BWP of the first serving cell.

It should be noted that in a case that only one serving frequency is configured for the terminal device, the second serving frequency may include only the neighboring serving frequency of the first serving frequency. In a case that a plurality of serving frequencies are configured for the terminal device, the second serving frequency may include at least one of the neighboring serving frequency of the first serving frequency or the third serving frequency.

Specific transmission nodes of the first serving frequency may include some or all transmission nodes of the first serving frequency. Specific transmission nodes of the second serving frequency may include some or all transmission nodes of the second serving frequency. In some embodiments, the specific transmission node of the first serving frequency may be predefined by a protocol or configured by the network side device, and the specific transmission node of the second serving frequency may also be predefined by the protocol or configured by the network side device.

The SFTD value may include at least one of a system frame number difference or a frame boundary difference. The timing difference may also include at least one of a system frame number difference or a frame boundary difference. It should be noted that, in some cases, the timing difference may also be referred to as the SFTD value.

In some embodiments, in a case that at least two transmission nodes are configured for the first serving frequency of the terminal device, the terminal device may perform SFTD measurement based on the first measurement parameter. The at least two transmission nodes may be distinguished by using different transmission node physical identifiers, for example, Physical Cell Identifier (PCI). The first measurement parameter may be predefined by the protocol or configured by the network side, and the first measurement parameter may be used to instruct to measure at least one of the following: the SFTD value between the specific transmission node of the first serving frequency and the first network node, or the timing difference between the different specific transmission nodes of the first serving frequency.

For example, in a case that the first measurement parameter instructs to measure the SFTD value between the specific transmission node of the first serving frequency and the first network node, the terminal device may measure the SFTD value between the specific transmission node of the first serving frequency and the first network node, to obtain the SFTD value between the specific transmission node of the first serving frequency and the first network node, and may report the SFTD value to the network side device. In this way, the network side can better understand a timing difference between transmission nodes, and can perform a more accurate configuration.

It should be noted that, in a case that there are at least two specific transmission nodes of the first serving frequency, SFTD values between the at least two specific transmission nodes and the first network node may be directly separately measured; or an SFTD value between a part of specific transmission nodes in the at least two specific transmission nodes and the first network node may be measured, and a timing difference between the other part of specific transmission nodes in the at least two specific transmission nodes and the part of specific transmission nodes may be measured.

For another example, in a case that the first measurement parameter instructs to measure the timing difference between the different specific transmission nodes of the first serving frequency, the terminal device may measure the timing difference between the different specific transmission nodes of the first serving frequency, and may report the timing difference to the network side device. In this way, the network side device may calculate an SFTD value of a transmission node based on the timing difference, or send the timing difference to another terminal device, so that the another terminal device calculates an SFTD value of a transmission node.

For another example, in a case that the first measurement parameter instructs to measure the SFTD value between the specific transmission node of the first serving frequency and the first network node, and the timing difference between the different specific transmission nodes of the first serving frequency, the terminal device may measure the SFTD value between the specific transmission node of the first serving frequency and the first network node, and the timing difference between the different specific transmission nodes of the first serving frequency, to obtain the SFTD value between the specific transmission node of the first serving frequency and the first network node, and the timing difference between the different specific transmission nodes of the first serving frequency, and report the SFTD value and the timing difference to the network side device.

In some embodiments, in a case that at least two transmission nodes are also configured for the third serving frequency of the terminal device, the first measurement parameter may be further used to instruct to perform at least one of the following: measuring an SFTD value between a specific transmission node of the third serving frequency and the first serving frequency; measuring an SFTD value between the specific transmission node of the third serving frequency and a neighboring serving frequency of the third serving frequency; or measuring a timing difference between different specific transmission nodes of the third serving frequency.

In actual application, in a case that at least two transmission nodes are configured for a serving cell or a BWP of the terminal device, it usually cannot ensured that time points at which downlink signals of the at least two transmission nodes arrive at the terminal device side are synchronized, and therefore frame boundaries of a plurality of downlink signals in a same serving cell or BWP cannot be synchronized. If SFTD measurement is performed at a granularity of a cell or a BWP and an SFTD value is reported, accuracy of understanding a timing difference between different transmission nodes on the network side is relatively poor. However, in this embodiment of the present disclosure, SFTD measurement is performed at a granularity of a transmission node to obtain a timing difference between transmission nodes, so that accuracy of performing timing difference measurement on different transmission nodes in a same serving cell or BWP can be improved, and the network side can further better understand a timing difference between different transmission nodes in a same cell or BWP.

In some embodiments, the performing system frame number and frame timing difference SFTD measurement according to a first measurement parameter in step 301 may include:

in a case that there are at least two specific transmission nodes of the first serving frequency, and the first measurement parameter instructs to at least measure the SFTD value between the specific transmission node of the first serving frequency and the first network node, measuring a first SFTD value between a first specific transmission node and the first network node, and measuring a first timing difference between the first specific transmission node and a second specific transmission node, where both the first specific transmission node and the second specific transmission node are specific transmission nodes of the first serving frequency.

In this embodiment, the first specific transmission node may include one or more specific transmission nodes of the first serving frequency, and the second specific transmission node may include a specific transmission node other than the first specific transmission node in specific transmission nodes of the first serving frequency. In some embodiments, the first specific transmission node may be configured by the network side device, or the first specific transmission node may be predefined by the protocol, for example, the protocol predefines that the first specific transmission node is a primary transmission node of the first serving frequency or the first transmission node that performs information transmission in the first serving frequency.

For example, if a specific transmission node PCI-1 and a specific transmission node PCI-2 are configured for a PCell of the terminal device, and the first measurement parameter instructs to measure an SFTD value between a specific transmission node of the PCell and a PSCell, an SFTD value between a specific transmission node PCI-1 and the PSCell may be measured, and a timing difference between the specific transmission node PCI-1 and a specific transmission node PCI-2 may be measured. In this way, an SFTD value between the specific transmission node PCI-2 and the PSCell may be obtained through calculation based on the SFTD value between the specific transmission node PCI-1 and the PSCell and the timing difference between the specific transmission node PCI-1 and the specific transmission node PCI-2.

In this embodiment, in a case that there are at least two specific transmission nodes of the first serving frequency, and the first measurement parameter instructs to measure t least the SFTD value between the specific transmission node of the first serving frequency and the first network node, the first SFTD value between the first specific transmission node and the first network node and the first timing difference between the first specific transmission node and the second specific transmission node are measured. In this way, an SFTD value between the second specific transmission node and the first network node may be obtained based on the first SFTD value between the first specific transmission node and the first network node and the first timing difference between the first specific transmission node and the second specific transmission node, thereby improving efficiency and flexibility of measuring an SFTD value.

In some embodiments, the method may further include:

calculating a second SFTD value between the second specific transmission node and the first network node according to the first SFTD value and the first timing difference; and reporting the first SFTD value and the second SFTD value to a network side device, or reporting the first SFTD value, the second SFTD value, and the first timing difference to a network side device.

In this embodiment, the first SFTD value is an SFTD value between the first specific transmission node and the first network node, the first timing difference is a timing difference between the first specific transmission node and the second specific transmission node, and the second SFTD value is an SFTD value between the second specific transmission node and the first network node.

After obtaining the first SFTD value and the first timing difference through measurement, the terminal device may calculate the second SFTD value based on the first SFTD value and the first timing difference. For example, a system frame number difference of the second SFTD value may be calculated according to a system frame number difference of the first SFTD value and a system frame number difference of the first timing difference, for example, a difference between the system frame number difference of the first SFTD value and the system frame number difference of the first timing difference is used as the system frame number difference of the second SFTD value. A frame boundary difference of the second SFTD value may be calculated according to a frame boundary difference of the first SFTD value and a frame boundary difference of the first timing difference, for example, a difference between the frame boundary difference of the first SFTD value and the frame boundary difference of the first timing difference is used as the frame boundary difference of the second SFTD value.

Further, after the second SFTD value is obtained through calculation, the first SFTD value and the second SFTD value may be reported to the network side device. In this way, the network side device can learn an SFTD value between each specific transmission node of the first serving frequency and the first network node, so that the network side device performs a more accurate configuration. In some embodiments, the first SFTD value, the second SFTD value, and the first timing difference may be reported to the network side device. In this way, the network side device not only learns an SFTD value between each specific transmission node of the first serving frequency and the first network node, but also the network side device calculates an SFTD value between each specific transmission node of the first serving frequency and another network node based on the first timing difference, or the network side device sends the first timing difference to another terminal device, so that the another terminal device calculates an SFTD value of a transmission node.

In some embodiments, the method may further include:

reporting the first SFTD value and the first timing difference to a network side device.

In this embodiment, after obtaining the first SFTD value and the first timing difference through measurement, the terminal device may directly report the first SFTD value and the first timing difference to the network side device. In this way, the network side device can calculate an SFTD value between the second specific transmission node and the first network node based on the first SFTD value and the first timing difference, so that calculation resources of the terminal device can be saved while ensuring that the network side device can learn an SFTD value between each specific transmission node of the first serving frequency and the first network node.

In some embodiments, a specific transmission node of a fourth serving frequency is configured by a network side device or predefined by a protocol, and the fourth serving frequency includes at least one of the first serving frequency or the second serving frequency.

In some embodiments, the specific transmission node of the first serving frequency may be configured by the network side device or predefined by the protocol, and the specific transmission node of the second serving frequency may also be configured by the network side device or predefined by the protocol.

For example, the network side device may configure a transmission node PCI-1 of the first serving frequency as a specific transmission node, or the protocol may predefine that a transmission node in an active state in the first serving frequency as a specific transmission node.

In some embodiments, in a case that the specific transmission node of the fourth serving frequency is predefined by the protocol, the specific transmission node of the fourth serving frequency includes one of the following:

all transmission nodes of the fourth serving frequency;

a transmission node in an active state in all the transmission nodes of the fourth serving frequency; or a transmission node of a first type in all the transmission nodes of the fourth serving frequency, where the transmission node of the first type includes at least one of a primary transmission node, an initial transmission node, or a default transmission node.

In this embodiment, in a case that the specific transmission node of the first serving frequency is predefined by the protocol, the specific transmission node of the first serving frequency may include one of the following:

all transmission nodes of the first serving frequency;

a transmission node in an active state in all the transmission nodes of the first serving frequency; or a transmission node of a first type in all the transmission nodes of the first serving frequency, where the transmission node of the first type includes at least one of a primary transmission node, an initial transmission node, or a default transmission node.

In a case that the specific transmission node of the second serving frequency is predefined by the protocol, the specific transmission node of the second serving frequency may include one of the following:

all transmission nodes of the second serving frequency;

a transmission node in an active state in all the transmission nodes of the second serving frequency; or a transmission node of a first type in all the transmission nodes of the second serving frequency, where the transmission node of the first type includes at least one of a primary transmission node, an initial transmission node, or a default transmission node.

It should be noted that the primary transmission node and the default transmission node may be configured by the network side device or predefined by the protocol. The initial transmission node may be the first activated transmission node or the first transmission node that performs information transmission in a plurality of transmission nodes of a serving frequency.

In some embodiments, in a case that the at least two transmission nodes are configured for the first serving frequency of the terminal device, transmission node physical identifiers of different transmission nodes in the at least two transmission nodes are different, where the transmission node physical identifier includes at least one of the following:

a physical serving frequency identifier;

a reference signal identifier;

a port number identifier corresponding to a reference signal; or a resource location identifier of a control channel.

In this embodiment, the physical serving frequency identifier may include but is not limited to a physical cell identifier, for example, a PCI-1.

The reference signal identifier may include but is not limited to at least one of a Synchronous Signal Block (SSB) identifier, a Channel State Information-Reference Signal (CSI-RS) identifier, or the like, for example, an SSB-1 or a CSI-RS-1. In some embodiments, the reference signal identifier may be a reference signal identifier of a control channel, for example, an SSB identifier of the control channel or a CSI-RS identifier of the control channel.

The port number identifier corresponding to the reference signal is, for example, a port-1. In some embodiments, the port number identifier corresponding to the reference signal may be a port number identifier corresponding to a reference signal of a control channel.

The resource location identifier of the control channel may include but is not limited to at least one of a Control Resource Set (CORESET) identifier or a search space identifier of a Physical Downlink Control Channel (PDCCH).

In some embodiments, the method may further include:

reporting the SFTD measurement result and first information to a network side device, where the first information includes at least one of the following:

a transmission node physical identifier of a third specific transmission node;

a serving frequency identifier of a serving frequency corresponding to the third specific transmission node;

a type identifier of the serving frequency corresponding to the third specific transmission node; or a measurement result of at least one of a Reference Signal Received Power (RSRP), Reference Signal Received Quality (RSRQ), or a Received Signal Strength Indicator (RSSI) of the third specific transmission node, where the third specific transmission node includes at least one of the specific transmission node of the first serving frequency or the specific transmission node of the second serving frequency.

In this embodiment, the SFTD measurement result corresponds to SFTD measurement performed by the terminal device. For example, if the terminal device measures the SFTD value between the specific transmission node of the first serving frequency and the first network node, the SFTD measurement result includes the SFTD value between the specific transmission node of the first serving frequency and the first network node. If the terminal device measures the timing difference between the different specific transmission nodes of the first serving frequency, the SFTD measurement result includes the timing difference between the different specific transmission nodes of the first serving frequency. If the terminal device measures the SFTD value between the specific transmission node of the first serving frequency and the first network node and the timing difference between the different specific transmission nodes of the first serving frequency, the SFTD measurement result includes the SFTD value between the specific transmission node of the first serving frequency and the first network node and the timing difference between the different specific transmission nodes of the first serving frequency.

The transmission node physical identifier of the third specific transmission node may include at least one of a physical serving frequency identifier, a reference signal identifier, a port number identifier corresponding to a reference signal, or a resource location identifier of a control channel that are of the specific transmission node.

For the serving frequency identifier of the serving frequency corresponding to the third specific transmission node, for example, if the serving frequency corresponding to the third specific transmission node is a cell, the serving frequency identifier may be a cell identifier; or if the serving frequency corresponding to the third specific transmission node is a BWP, the serving frequency identifier may be a BWP identifier.

For the type identifier of the serving frequency corresponding to the third specific transmission node, for example, if the serving frequency corresponding to the third specific transmission node is a cell, the type identifier may be used to indicate a type of the cell, for example, a PCell or a PSCell; or if the serving frequency corresponding to the third specific transmission node is a BWP, the type identifier may be used to indicate a type of the BWP, for example, a BWP of a PCell or a BWP of a PSCell.

In this embodiment, the terminal device not only reports the SFTD measurement result to the network side device so that the network side device learns a timing difference between specific transmission nodes, but also reports the first information to the network side device so that the network side device performs configuration reference.

In some embodiments, one of the first serving frequency and the third serving frequency is a primary cell, or the other is a primary secondary cell.

In this embodiment, when the network side device configures a DC architecture for the terminal device, one of the first serving frequency or the second serving frequency may be a primary cell, and the other may be a primary secondary cell.

For example, in a case that the first serving frequency is a primary cell and the third serving frequency is a primary secondary cell, the first measurement parameter may be used to instruct to perform at least one of the following:

measuring an SFTD value between a specific transmission node of the primary cell and the primary secondary cell;

measuring an SFTD value between the specific transmission node of the primary cell and a specific transmission node of the primary secondary cell;

measuring an SFTD value between the specific transmission node of the primary cell and a neighboring cell of the primary cell;

measuring an SFTD value between the specific transmission node of the primary cell and a specific transmission node of the neighboring cell of the primary cell; or measuring a timing difference between different specific transmission nodes of the primary cell.

For another example, in a case that the first serving frequency is a primary secondary cell and the third serving frequency is a primary cell, the first measurement parameter may be used to instruct to perform at least one of the following:

measuring an SFTD value between a specific transmission node of the primary secondary cell and the primary cell;

measuring an SFTD value between the specific transmission node of the primary secondary cell and a specific transmission node of the primary cell;

measuring an SFTD value between the specific transmission node of the primary secondary cell and a neighboring cell of the primary secondary cell;

measuring an SFTD value between the specific transmission node of the primary secondary cell and a specific transmission node of the neighboring cell of the primary secondary cell; or measuring a timing difference between different specific transmission nodes of the primary secondary cell.

In some embodiments, in a case that one of the first serving frequency or the third serving frequency is a primary cell, and the other is a primary secondary cell, the first measurement parameter is further used to instruct to perform at least one of the following:

measuring an SFTD value between a specific transmission node of the third serving frequency and the first serving frequency;

measuring an SFTD value between the specific transmission node of the third serving frequency and a neighboring serving frequency of the third serving frequency; or measuring a timing difference between different specific transmission nodes of the third serving frequency.

For example, in a case that the first serving frequency is a primary secondary cell and the third serving frequency is a primary cell, the first measurement parameter may be further used to instruct to perform at least one of the following:

measuring an SFTD value between a specific transmission node of the primary secondary cell and the primary cell;

measuring an SFTD value between the specific transmission node of the primary secondary cell and a neighboring cell of the primary secondary cell;

measuring an SFTD value between the specific transmission node of the primary secondary cell and a specific transmission node of the neighboring cell of the primary secondary cell; or measuring a timing difference between different specific transmission nodes of the primary secondary cell.

For another example, in a case that the first serving frequency is a primary secondary cell and the third serving frequency is a primary cell, the first measurement parameter may be further used to instruct to perform at least one of the following:

measuring an SFTD value between a specific transmission node of the primary cell and the primary secondary cell;

measuring an SFTD value between the specific transmission node of the primary cell and a neighboring cell of the primary cell;

measuring an SFTD value between the specific transmission node of the primary cell and a specific transmission node of the neighboring cell of the primary cell; or measuring a timing difference between different specific transmission nodes of the primary cell.

An embodiment of the present disclosure provides a measurement method, performed by a network side device. Referring to FIG. 4, FIG. 4 is a schematic flowchart of another measurement method according to an embodiment of the present disclosure. As shown in FIG. 4, the method includes the following steps.

Step 401: In a case that at least two transmission nodes are configured for a first serving frequency of a terminal device, send a first measurement parameter to the terminal device.

The first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

In this embodiment, the foregoing serving frequency may include a cell or a BWP of a cell. The first serving frequency may include a first serving cell of the terminal device or a BWP of a first serving cell, where the first serving cell may be any serving cell of the terminal device.

For the neighboring serving frequency of the first serving frequency, in a case that the first serving frequency is the first serving cell, the neighboring serving frequency of the first serving frequency may include at least one of a neighboring cell of the first serving cell or a BWP of the neighboring cell of the first serving cell; or in a case that the first serving frequency is a first BWP of the first serving cell, the neighboring serving frequency of the first serving frequency may include at least one of a BWP other than the first BWP in the first serving cell, a neighboring cell of the first serving cell, or a BWP of the neighboring cell of the first serving cell. The first BWP may be any BWP of the first serving cell.

The third serving frequency may include a serving frequency other than the first serving frequency in serving frequencies of the terminal device. For example, if serving cells of the terminal device include the first serving cell and a second serving cell, and the first serving frequency is the first serving cell, the third serving frequency may include at least one of the second serving cell or a BWP of the second serving cell. If serving cells of the terminal device include the first serving cell and a second serving cell, and the first serving frequency is the first BWP of the first serving cell, the third serving frequency may include at least one of a BWP other than the first BWP in the first serving cell, the second serving cell, or a BWP of the second serving cell. The first BWP may be any BWP of the first serving cell.

It should be noted that in a case that only one serving frequency is configured for the terminal device, the second serving frequency may include only the neighboring serving frequency of the first serving frequency. In a case that a plurality of serving frequencies are configured for the terminal device, the second serving frequency may include at least one of the neighboring serving frequency of the first serving frequency or the third serving frequency.

Specific transmission nodes of the first serving frequency may include some or all transmission nodes of the first serving frequency. Specific transmission nodes of the second serving frequency may include some or all transmission nodes of the second serving frequency. In some embodiments, the specific transmission node of the first serving frequency may be predefined by a protocol or configured by the network side device, and the specific transmission node of the second serving frequency may also be predefined by the protocol or configured by the network side device.

The SFTD value may include at least one of a system frame number difference or a frame boundary difference. The timing difference may also include at least one of a system frame number difference or a frame boundary difference. It should be noted that, in some cases, the timing difference may also be referred to as the SFTD value.

In some embodiments, in a case that the network side device configures at least two transmission nodes for the first serving frequency of the terminal device, the network side device may configure the first measurement parameter for the terminal device, so that the terminal device can perform SFTD measurement based on the first measurement parameter. The first measurement parameter may be used to instruct to measure at least one of the following: the SFTD value between the specific transmission node of the first serving frequency and the first network node, or the timing difference between the different specific transmission nodes of the first serving frequency.

It should be noted that in a case that the network side device configures at least two transmission nodes for the first serving frequency of the terminal device, the at least two transmission nodes may be distinguished by using different transmission node physical identifiers, for example, PCIs.

In this embodiment of the present disclosure, in a case that at least two transmission nodes are configured for a first serving frequency of a terminal device, a first measurement parameter is sent to the terminal device, so that the terminal device can perform SFTD measurement based on the first measurement parameter and report an SFTD measurement result to a network side device. Because the terminal device can perform SFTD measurement at a granularity of a transmission node, the network side can further better understand a timing difference between different transmission nodes.

In some embodiments, the method may further include:

in a case that there are at least two specific transmission nodes of the first serving frequency, and the first measurement parameter instructs to at least measure the SFTD value between the specific transmission node of the first serving frequency and the first network node, receiving a first SFTD value and a first timing difference from the terminal device; and calculating a second SFTD value between a second specific transmission node and the first network node according to the first SFTD value and the first timing difference, where the first SFTD value is an SFTD value between a first specific transmission node and the first network node, the first timing difference is a timing difference between the first specific transmission node and the second specific transmission node, and both the first specific transmission node and the second specific transmission node are specific transmission nodes of the first serving frequency.

In this embodiment, the first specific transmission node may include one or more specific transmission nodes of the first serving frequency, and the second specific transmission node may include a specific transmission node other than the first specific transmission node in specific transmission nodes of the first serving frequency. In some embodiments, the first specific transmission node may be configured by the network side device, or the first specific transmission node may be predefined by the protocol, for example, the protocol predefines that the first specific transmission node is a primary transmission node of the first serving frequency or the first transmission node that performs information transmission in the first serving frequency.

In some embodiments, when receiving the first SFTD value and the first timing difference, the network side device may calculate the second SFTD value between the second specific transmission node and the first network node based on the first SFTD value and the first timing difference. For example, a system frame number difference of the second SFTD value may be calculated according to a system frame number difference of the first SFTD value and a system frame number difference of the first timing difference, for example, a difference between the system frame number difference of the first SFTD value and the system frame number difference of the first timing difference is used as the system frame number difference of the second SFTD value. A frame boundary difference of the second SFTD value may be calculated according to a frame boundary difference of the first SFTD value and a frame boundary difference of the first timing difference, for example, a difference between the frame boundary difference of the first SFTD value and the frame boundary difference of the first timing difference is used as the frame boundary difference of the second SFTD value.

In this embodiment, the network side device calculates an SFTD value between the second specific transmission node and the first network node based on the first SFTD value and the first timing difference, so that calculation resources of the terminal device can be saved while ensuring that the network side device can learn an SFTD value between each specific transmission node of the first serving frequency and the first network node.

In some embodiments, the method may further include:

in a case that there are at least two specific transmission nodes of the first serving frequency, and the first measurement parameter instructs to at least measure the SFTD value between the specific transmission node of the first serving frequency and the first network node, receiving a first SFTD value and a second SFTD value from the terminal device; or in a case that there are at least two specific transmission nodes of the first serving frequency, and the first measurement parameter instructs to at least measure the SFTD value between the specific transmission node of the first serving frequency and the first network node, receiving a first SFTD value, a second SFTD value, and a first timing difference from the terminal device, where the first SFTD value is an SFTD value between a first specific transmission node and the first network node, the second SFTD value is an SFTD value between a second specific transmission node and the first network node, the first timing difference is a timing difference between the first specific transmission node and the second specific transmission node, and both the first specific transmission node and the second specific transmission node are specific transmission nodes of the first serving frequency.

In an implementation, the network side device may receive the first SFTD value and the second SFTD value from the terminal device, so that the network side device can learn an SFTD value between each specific transmission node of the first serving frequency and the first network node, and therefore the network side device performs a more accurate configuration.

In another implementation, the network side device may receive the first SFTD value, the second SFTD value, and the first timing difference from the terminal device. In this way, the network side device not only learns an SFTD value between each specific transmission node of the first serving frequency and the first network node, but also the network side device calculates an SFTD value between each specific transmission node of the first serving frequency and another network node based on the first timing difference, or the network side device sends the first timing difference to another terminal device, so that the another terminal device calculates an SFTD value of a transmission node.

In some embodiments, a specific transmission node of a fourth serving frequency is configured by the network side device, and the fourth serving frequency includes at least one of the first serving frequency or the second serving frequency.

In some embodiments, in a case that the at least two transmission nodes are configured for the first serving frequency of the terminal device, transmission node physical identifiers of different transmission nodes in the at least two transmission nodes are different, where the transmission node physical identifier includes at least one of the following:
  a physical serving frequency identifier;
  a reference signal identifier;
  a port number identifier corresponding to a reference signal; or
  a resource location identifier of a control channel.

In this embodiment, the physical serving frequency identifier may include but is not limited to a physical cell identifier, for example, a PCI-1.

The reference signal identifier may include but is not limited to at least one of an SSB identifier, a CSI-RS identifier, or the like, for example, an SSB-1 or a CSI-RS-1. In some embodiments, the reference signal identifier may be a reference signal identifier of a control channel, for example, an SSB identifier of the control channel or a CSI-RS identifier of the control channel.

The port number identifier corresponding to the reference signal is, for example, a port-1. In some embodiments, the port number identifier corresponding to the reference signal may be a port number identifier corresponding to a reference signal of a control channel.

The resource location identifier of the control channel may include but is not limited to at least one of a CORESET identifier or a search space identifier of a PDCCH.

In some embodiments, the method may further include:
  receiving an SFTD measurement result and first information from the terminal device, where
  the first information includes at least one of the following:
  a transmission node physical identifier of a third specific transmission node;
  a serving frequency identifier of a serving frequency corresponding to the third specific transmission node;
  a type identifier of the serving frequency corresponding to the third specific transmission node; or
  a measurement result of at least one of an RSRP, RSRQ, or an RSSI of the third specific transmission node, where
  the third specific transmission node includes at least one of the specific transmission node of the first serving frequency or the specific transmission node of the second serving frequency.

In this embodiment, the SFTD measurement result corresponds to SFTD measurement performed by the terminal device. For example, if the terminal device measures the SFTD value between the specific transmission node of the first serving frequency and the first network node, the SFTD measurement result includes the SFTD value between the specific transmission node of the first serving frequency and the first network node. If the terminal device measures the timing difference between the different specific transmission nodes of the first serving frequency, the SFTD measurement result includes the timing difference between the different specific transmission nodes of the first serving frequency. If the terminal device measures the SFTD value between the specific transmission node of the first serving frequency and the first network node and the timing difference between the different specific transmission nodes of the first serving frequency, the SFTD measurement result includes the SFTD value between the specific transmission node of the first serving frequency and the first network node and the timing difference between the different specific transmission nodes of the first serving frequency.

The transmission node physical identifier of the third specific transmission node may include at least one of a physical serving frequency identifier, a reference signal identifier, a port number identifier corresponding to a reference signal, or a resource location identifier of a control channel that are of the specific transmission node.

For the serving frequency identifier of the serving frequency corresponding to the third specific transmission node, for example, if the serving frequency corresponding to the third specific transmission node is a cell, the serving frequency identifier may be a cell identifier; or if the serving frequency corresponding to the third specific transmission node is a BWP, the serving frequency identifier may be a BWP identifier.

For the type identifier of the serving frequency corresponding to the third specific transmission node, for example, if the serving frequency corresponding to the third specific transmission node is a cell, the type identifier may be used to indicate a type of the cell, for example, a PCell or a PSCell; or if the serving frequency corresponding to the third specific transmission node is a BWP, the type identifier may be used to indicate a type of the BWP, for example, a BWP of a PCell or a BWP of a PSCell.

In this embodiment, the network side device not only receives the SFTD measurement result from the terminal device to learn a timing difference between specific transmission nodes, but also receives the first information from the terminal device, so that a configuration can be performed based on the first information, thereby improving accuracy of performing a UE configuration by the network side device.

In some embodiments, one of the first serving frequency and the third serving frequency is a primary cell, or the other is a primary secondary cell.

In this embodiment, when the network side device configures a DC architecture for the terminal device, one of the first serving frequency or the second serving frequency may be a primary cell, and the other may be a primary secondary cell.

For example, in a case that the first serving frequency is a primary cell and the third serving frequency is a primary secondary cell, the first measurement parameter may be used to instruct to perform at least one of the following:
  measuring an SFTD value between a specific transmission node of the primary cell and the primary secondary cell;

measuring an SFTD value between the specific transmission node of the primary cell and a specific transmission node of the primary secondary cell;

measuring an SFTD value between the specific transmission node of the primary cell and a neighboring cell of the primary cell;

measuring an SFTD value between the specific transmission node of the primary cell and a specific transmission node of the neighboring cell of the primary cell; or measuring a timing difference between different specific transmission nodes of the primary cell.

For another example, in a case that the first serving frequency is a primary secondary cell and the third serving frequency is a primary cell, the first measurement parameter may be used to instruct to perform at least one of the following:

measuring an SFTD value between a specific transmission node of the primary secondary cell and the primary cell;

measuring an SFTD value between the specific transmission node of the primary secondary cell and a specific transmission node of the primary cell;

measuring an SFTD value between the specific transmission node of the primary secondary cell and a neighboring cell of the primary secondary cell;

measuring an SFTD value between the specific transmission node of the primary secondary cell and a specific transmission node of the neighboring cell of the primary secondary cell; or measuring a timing difference between different specific transmission nodes of the primary secondary cell.

In some embodiments, in a case that one of the first serving frequency or the third serving frequency is a primary cell, and the other is a primary secondary cell, the first measurement parameter is further used to instruct to perform at least one of the following:

measuring an SFTD value between a specific transmission node of the third serving frequency and the first serving frequency;

measuring an SFTD value between the specific transmission node of the third serving frequency and a neighboring serving frequency of the third serving frequency; or measuring a timing difference between different specific transmission nodes of the third serving frequency.

For example, in a case that the first serving frequency is a primary secondary cell and the third serving frequency is a primary cell, the first measurement parameter may be further used to instruct to perform at least one of the following:

measuring an SFTD value between a specific transmission node of the primary secondary cell and the primary cell;

measuring an SFTD value between the specific transmission node of the primary secondary cell and a neighboring cell of the primary secondary cell;

measuring an SFTD value between the specific transmission node of the primary secondary cell and a specific transmission node of the neighboring cell of the primary secondary cell; or measuring a timing difference between different specific transmission nodes of the primary secondary cell.

For another example, in a case that the first serving frequency is a primary secondary cell and the third serving frequency is a primary cell, the first measurement parameter may be further used to instruct to perform at least one of the following:

measuring an SFTD value between a specific transmission node of the primary cell and the primary secondary cell;

measuring an SFTD value between the specific transmission node of the primary cell and a neighboring cell of the primary cell;

measuring an SFTD value between the specific transmission node of the primary cell and a specific transmission node of the neighboring cell of the primary cell; or measuring a timing difference between different specific transmission nodes of the primary cell.

Figure 5:
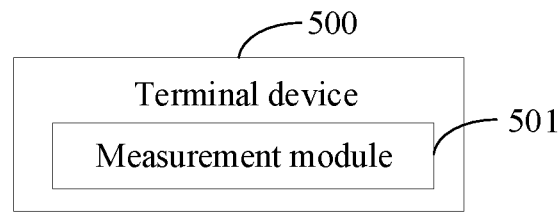
FIG. 5 is a structural diagram of a terminal device according to an embodiment of the present disclosure.

Referring to FIG. 5, FIG. 5 is a structural diagram of a terminal device according to an embodiment of the present disclosure. As shown in FIG. 5, a terminal device 500 includes:

a measurement module 501, configured to: in a case that at least two transmission nodes are configured for a first serving frequency of the terminal device, perform system frame number and frame timing difference SFTD measurement according to a first measurement parameter to obtain an SFTD measurement result, where the first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

In some embodiments, the measurement module is configured to:

in a case that there are at least two specific transmission nodes of the first serving frequency, and the first measurement parameter instructs to at least measure the SFTD value between the specific transmission node of the first serving frequency and the first network node, measure a first SFTD value between a first specific transmission node and the first network node, and measure a first timing difference between the first specific transmission node and a second specific transmission node, where both the first specific transmission node and the second specific transmission node are specific transmission nodes of the first serving frequency.

In some embodiments, the terminal device further includes:

a first calculating module, configured to calculate a second SFTD value between the second specific transmission node and the first network node according to the first SFTD value and the first timing difference; and a first reporting module, configured to report the first SFTD value and the second SFTD value to a network side device, or report the first SFTD value, the second SFTD value, and the first timing difference to a network side device.

In some embodiments, the terminal device further includes:

a second reporting module, configured to report the first SFTD value and the first timing difference to a network side device.

In some embodiments, a specific transmission node of a fourth serving frequency is configured by a network side device or predefined by a protocol, and the fourth serving frequency includes at least one of the first serving frequency or the second serving frequency.

In some embodiments, in a case that the specific transmission node of the fourth serving frequency is predefined by the protocol, the specific transmission node of the fourth serving frequency includes one of the following:

all transmission nodes of the fourth serving frequency;

a transmission node in an active state in all the transmission nodes of the fourth serving frequency; or a transmission node of a first type in all the transmission nodes of the fourth serving frequency, where the transmission node of the first type includes at least one of a primary transmission node, an initial transmission node, or a default transmission node.

In some embodiments, in a case that the at least two transmission nodes are configured for the first serving frequency of the terminal device, transmission node physical identifiers of different transmission nodes in the at least two transmission nodes are different, where the transmission node physical identifier includes at least one of the following:

a physical serving frequency identifier;

a reference signal identifier;

a port number identifier corresponding to a reference signal; or a resource location identifier of a control channel.

In some embodiments, the terminal device further includes:

a third reporting module, configured to report the SFTD measurement result and first information to a network side device, where the first information includes at least one of the following:

a transmission node physical identifier of a third specific transmission node;

a serving frequency identifier of a serving frequency corresponding to the third specific transmission node;

a type identifier of the serving frequency corresponding to the third specific transmission node; or a measurement result of at least one of a reference signal received power RSRP, reference signal received quality RSRQ, or a received signal strength indicator RSSI of the third specific transmission node, where the third specific transmission node includes at least one of the specific transmission node of the first serving frequency or the specific transmission node of the second serving frequency.

In some embodiments, the first measurement parameter is configured by a network side device or predefined by a protocol.

In some embodiments, one of the first serving frequency or the third serving frequency is a primary cell, and the other is a primary secondary cell.

In some embodiments, in a case that one of the first serving frequency or the third serving frequency is a primary cell, and the other is a primary secondary cell, the first measurement parameter is further used to instruct to perform at least one of the following:

measuring an SFTD value between a specific transmission node of the third serving frequency and the first serving frequency;

measuring an SFTD value between the specific transmission node of the third serving frequency and a neighboring serving frequency of the third serving frequency; or measuring a timing difference between different specific transmission nodes of the third serving frequency.

The terminal device 500 provided in this embodiment of the present disclosure can implement the processes implemented by the terminal device in the foregoing method embodiment. To avoid repetition, details are not described herein again.

According to the terminal device 500 in this embodiment of the present disclosure, the measurement module 501 is configured to: in a case that at least two transmission nodes are configured for a first serving frequency of the terminal device, perform system frame number and frame timing difference SFTD measurement according to a first measurement parameter to obtain an SFTD measurement result, where the first measurement parameter is used to instruct to perform at least one of the following: measuring an SFTD value between a specific transmission node of the first serving frequency and a first network node, or measuring a timing difference between different specific transmission nodes of the first serving frequency. In a case that transmission signals of one serving cell or BWP of the terminal device are from a plurality of transmission nodes, SFTD measurement is performed at a granularity of a transmission node to obtain a timing difference between transmission nodes, so that accuracy of performing timing difference measurement on different transmission nodes in a same serving cell or BWP can be improved, and a network side can further better understand a timing difference between different transmission nodes in a same cell or BWP.

Figure 6:
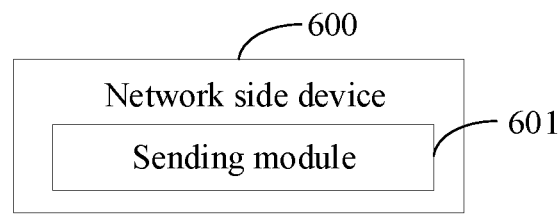
FIG. 6 is a structural diagram of a network side device according to an embodiment of the present disclosure.

Referring to FIG. 6, FIG. 6 is a structural diagram of a network side device according to an embodiment of the present disclosure. As shown in FIG. 6, a network side device 600 includes:

a sending module 601, configured to: in a case that at least two transmission nodes are configured for a first serving frequency of a terminal device, send a first measurement parameter to the terminal device, where the first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

In some embodiments, the network side device further includes:

a first receiving module, configured to: in a case that there are at least two specific transmission nodes of the first serving frequency, and the first measurement parameter instructs to at least measure the SFTD value between the specific transmission node of the first serving frequency and the first network node, receive a first SFTD value and a first timing difference from the terminal device; and a second calculating module, configured to calculate a second SFTD value between a second specific transmission node and the first network node according to the first SFTD value and the first timing difference, where the first SFTD value is an SFTD value between a first specific transmission node and the first network node, the first timing difference is a timing difference between the first specific transmission node and the second specific transmission node, and both the first specific transmission node and the second specific transmission node are specific transmission nodes of the first serving frequency.

In some embodiments, the network side device further includes a second receiving module, which is configured to:

in a case that there are at least two specific transmission nodes of the first serving frequency, and the first measurement parameter instructs to at least measure the SFTD value between the specific transmission node of the first serving frequency and the first network node, receive a first SFTD value and a second SFTD value from the terminal device; or in a case that there are at least two specific transmission nodes of the first serving frequency, and the first measurement parameter instructs to at least measure the SFTD value between the specific transmission node of the first serving frequency and the first network node, receive a first SFTD value, a second SFTD value, and a first timing difference from the terminal device, where the first SFTD value is an SFTD value between a first specific transmission node and the first network node, the second SFTD value is an SFTD value between a second specific transmission node and the first network node, the first timing difference is a timing difference between the first specific transmission node and the second specific transmission node, and both the first specific transmission node and the second specific transmission node are specific transmission nodes of the first serving frequency.

In some embodiments, a specific transmission node of a fourth serving frequency is configured by the network side device, and the fourth serving frequency includes at least one of the first serving frequency or the second serving frequency.

In some embodiments, in a case that the at least two transmission nodes are configured for the first serving frequency of the terminal device, transmission node physical identifiers of different transmission nodes in the at least two transmission nodes are different, where the transmission node physical identifier includes at least one of the following:

a physical serving frequency identifier;
a reference signal identifier;
a port number identifier corresponding to a reference signal; or
a resource location identifier of a control channel.

In some embodiments, the network side device further includes:

a third receiving module, configured to receive an SFTD measurement result and first information from the terminal device, where the first information includes at least one of the following:

a transmission node physical identifier of a third specific transmission node;
a serving frequency identifier of a serving frequency corresponding to the third specific transmission node;
a type identifier of the serving frequency corresponding to the third specific transmission node; or
a measurement result of at least one of a reference signal received power RSRP, reference signal received quality RSRQ, or a received signal strength indicator RSSI of the third specific transmission node, where the third specific transmission node includes at least one of the specific transmission node of the first serving frequency or the specific transmission node of the second serving frequency.

In some embodiments, one of the first serving frequency or the third serving frequency is a primary cell, and the other is a primary secondary cell.

In some embodiments, in a case that one of the first serving frequency or the third serving frequency is a primary cell, and the other is a primary secondary cell, the first measurement parameter is further used to instruct to perform at least one of the following:

measuring an SFTD value between a specific transmission node of the third serving frequency and the first serving frequency;
measuring an SFTD value between the specific transmission node of the third serving frequency and a neighboring serving frequency of the third serving frequency; or
measuring a timing difference between different specific transmission nodes of the third serving frequency.

The network side device 600 provided in this embodiment of the present disclosure can implement the processes implemented by the network side device in the foregoing method embodiment. To avoid repetition, details are not described herein again.

According to the network side device 600 in this embodiment of the present disclosure, the sending module 601 is configured to: in a case that at least two transmission nodes are configured for a first serving frequency of a terminal device, send a first measurement parameter to the terminal device, where the first measurement parameter is used to instruct to perform at least one of the following: measuring an SFTD value between a specific transmission node of the first serving frequency and a first network node, or measuring a timing difference between different specific transmission nodes of the first serving frequency. In this way, the terminal device may perform SFTD measurement based on the first measurement parameter and report an SFTD measurement result to the network side device. Because the terminal device may perform SFTD measurement at a granularity of a transmission node, the network side can further better understand a timing difference between different transmission nodes in a same serving cell or BWP.

Figure 7:
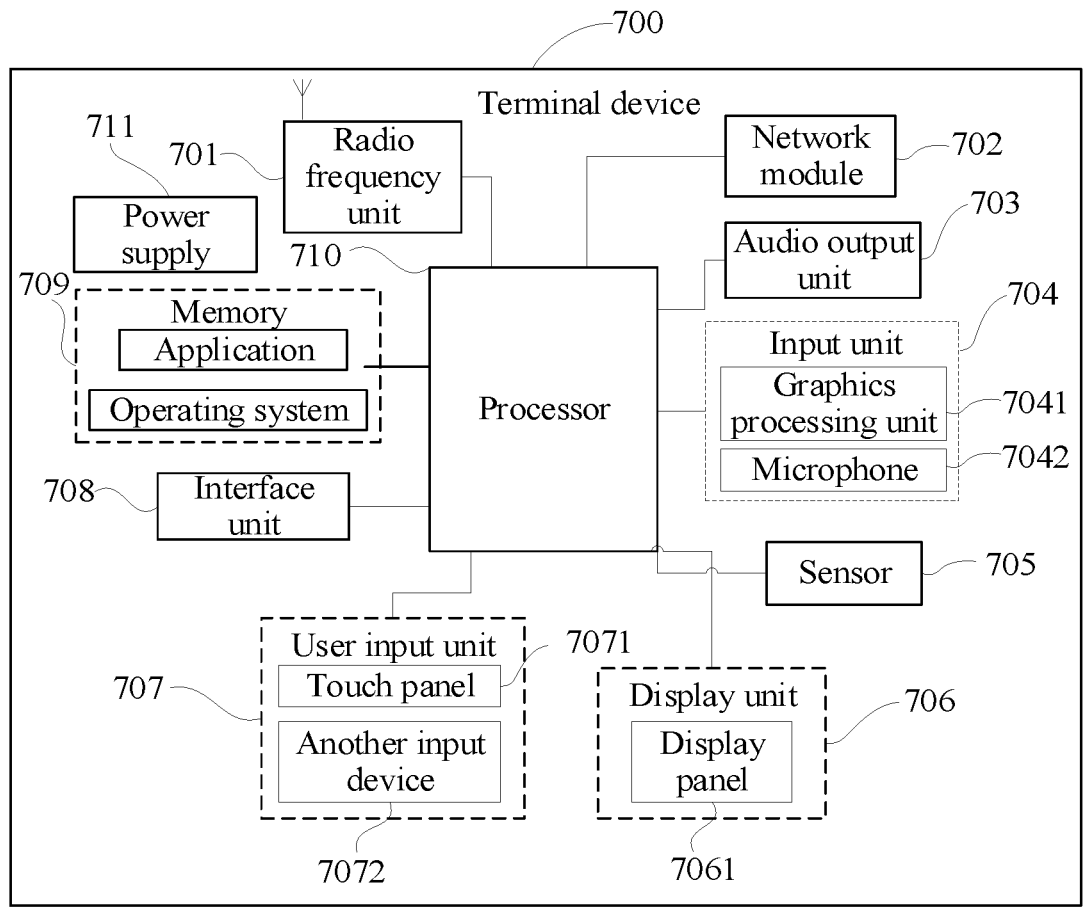
FIG. 7 is a structural diagram of another terminal device according to an embodiment of the present disclosure.

FIG. 7 is a structural diagram of another terminal device according to an embodiment of the present disclosure. Referring to FIG. 7, a terminal device 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. It can be understood by a person skilled in the art that, the terminal device structure shown in FIG. 7 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, an in-vehicle terminal, a wearable device, a pedometer, and the like.

The processor 710 is configured to: in a case that at least two transmission nodes are configured for a first serving frequency of the terminal device, perform system frame number and frame timing difference SFTD measurement according to a first measurement parameter to obtain an SFTD measurement result, where the first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

It should be understood that, in this embodiment of the present disclosure, the radio frequency unit 701 and the processor 710 can implement the processes implemented by the terminal device in the foregoing method embodiment. To avoid repetition, details are not described herein again.

It should be understood that, in this embodiment of the present disclosure, the radio frequency unit 701 may be configured to receive and send information or a signal in a call process. In some embodiments, after receiving downlink data from a base station, the radio frequency unit 701 sends the downlink data to the processor 710 for processing. In addition, the radio frequency unit 701 sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may communicate with a network and another device through a wireless communication system.

The terminal device provides wireless broadband Internet access for the user by using the network module 702, for example, helping the user to send and receive an e-mail, brows a web page, and access streaming media.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received voice, or a message received voice) related to a specific function implemented by the terminal device 700. The audio output unit 703 includes a speaker, a buzzer, a telephone receiver, and the like.

The input unit 704 is configured to receive an audio signal or a video signal. The input unit 704 may include a Graphics Processing Unit (GPU) 7041 and a microphone 7042, and the graphics processing unit 7041 processes image data of a still picture or video obtained by an image capture apparatus (for example, a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive a sound and can process such sound into audio data. Processed audio data may be converted, in a call mode, into a format that can be sent to a mobile communication base station by using the radio frequency unit 701 for output.

The terminal device 700 further includes at least one sensor 705, such as an optical sensor, a motion sensor, and other sensors. In some embodiments, the optical sensor includes an ambient light sensor and a proximity sensor. The ambient light sensor may adjust luminance of the display panel 7061 based on brightness of ambient light. The proximity sensor may turn off the display panel 7061 and/or backlight when the terminal device 700 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (for example, screen switching between landscape and portrait modes, a related game, or magnetometer posture calibration), a function related to vibration recognition (for example, a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by a user or information provided for a user. The display unit 706 may include a display panel 7061. The display panel 7061 may be configured in a form of a Liquid Crystal Display (LCD), an Organic Light-Emitting Diode (OLED), or the like.

The user input unit 707 may be configured to receive input digit or character information, and generate a key signal input related to a user setting and function control of the terminal device. In some embodiments, the user input unit 707 includes a touch panel 7071 and another input device 7072. The touch panel 7071 is also referred to as a touch-screen, and may collect a touch operation performed by a user on or near the touch panel 7071 (for example, an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 710, and receives and executes a command sent by the processor 710. In addition, the touch panel 7071 may be of a resistive type, a capacitive type, an infrared type, a surface acoustic wave type, or the like. The user input unit 707 may include the another input device 7072 in addition to the touch panel 7071. In some embodiments, the another input device 7072 may include but is not limited to a physical keyboard, a functional button (for example, a volume control button or a power on/off button), a trackball, a mouse, and a joystick. Details are not described herein.

Further, the touch panel 7071 may cover the display panel 7061. When detecting the touch operation on or near the touch panel 7071, the touch panel 7071 transmits the touch operation to the processor 710 to determine a type of a touch event, and then the processor 710 provides a corresponding visual output on the display panel 7061 based on the type of the touch event. In FIG. 7, although the touch panel 7071 and the display panel 7061 are used as two independent parts to implement input and output functions of the terminal device, in some embodiments, the touch panel 7071 and the display panel 7061 may be integrated to implement the input and output functions of the terminal device. This is not specifically limited herein.

The interface unit 708 is an interface for connecting an external apparatus with the terminal device 700. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 708 may be configured to receive input (for example, data information and power) from an external apparatus and transmit the received input to one or more elements in the terminal device 700 or may be configured to transmit data between the terminal device 700 and an external apparatus.

The memory 709 may be configured to store a software program and various data. The memory 709 may mainly include a program storage area and a data storage area. The program storage area may store an operating system, an application required by at least one function (for example, a sound play function or an image play function), and the like. The data storage area may store data (for example, audio data or an address book) created based on use of the mobile phone, and the like. In addition, the memory 709 may include a high-speed random access memory, and may further include a nonvolatile memory, for example, at least one magnetic disk storage device, a flash storage device, or another volatile solid-state storage device.

The processor 710 is a control center of the terminal device, and connects all the components of the entire terminal device by using various interfaces and lines. By running or executing a software program and/or a module that are/is stored in the memory 709 and by invoking data stored in the memory 709, the processor 710 performs various functions of the terminal device and data processing, to perform overall monitoring on the terminal device. The processor 710 may include one or more processing units. In some embodiments, an application processor and a modem processor may be integrated into the processor 710. The application processor mainly processes an operating system, a user interface, an application, and the like. The modem processor mainly processes wireless communications. It can be understood that, in some embodiments, the modem processor may not be integrated into the processor 710.

The terminal device 700 may further include the power supply 711 (for example, a battery) that supplies power to each component. In some embodiments, the power supply 711 may be logically connected to the processor 710 by using a power supply management system, so as to implement functions such as charging and discharging management, and power consumption management by using the power supply management system.

In addition, the terminal device 700 includes some function modules not shown, and details are not described herein.

An embodiment of the present disclosure further provides a terminal device, including a processor 710, a memory 709, and a computer program that is stored in the memory 709 and that can be run on the processor 710. When the computer program is executed by the processor 710, the processes of the foregoing measurement method embodiment are implemented and a same technical effect can be achieved. To avoid repetition, details are not described herein again.

Figure 8:
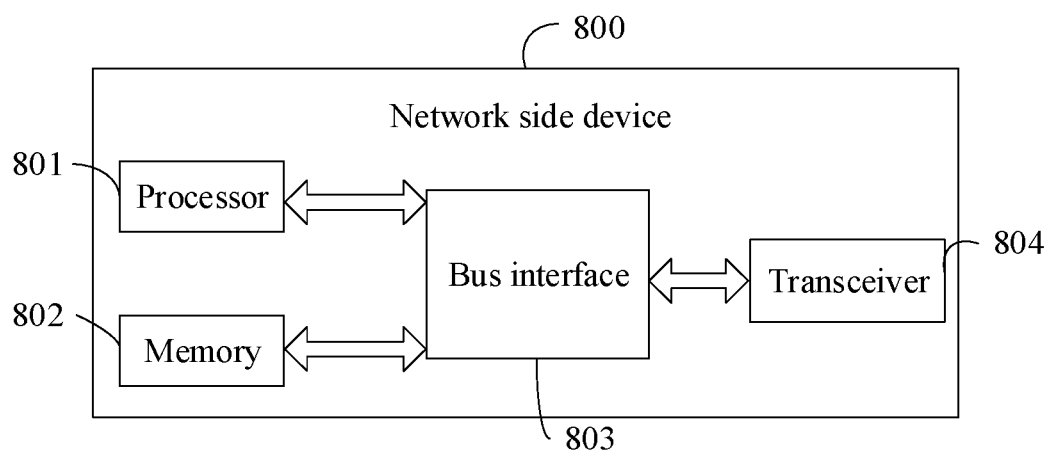
FIG. 8 is a structural diagram of another network side device according to an embodiment of the present disclosure.

Referring to FIG. 8, FIG. 8 is a structural diagram of another network side device according to an embodiment of the present disclosure. As shown in FIG. 8, a network side device 800 includes a processor 801, a memory 802, a bus interface 803, and a transceiver 804, where the processor 801, the memory 802, and the transceiver 804 are all connected to the bus interface 803.

In this embodiment of the present disclosure, the network side device 800 further includes a computer program that is stored in the memory 802 and that can be run on the processor 801.

In this embodiment of the present disclosure, the transceiver 804 is configured to:

in a case that at least two transmission nodes are configured for a first serving frequency of a terminal device, send a first measurement parameter to the terminal device, where the first measurement parameter is used to instruct to perform at least one of the following: measuring an SFTD value between a specific transmission node of the first serving frequency and a first network node, or measuring a timing difference between different specific transmission nodes of the first serving frequency; and the first network node includes a second serving frequency or a specific transmission node of a second serving frequency, the second serving frequency includes at least one of a neighboring serving frequency of the first serving frequency or a third serving frequency, and the third serving frequency is a serving frequency other than the first serving frequency in at least two serving frequencies of the terminal device; and both the SFTD value and the timing difference include at least one of a system frame number difference or a frame boundary difference.

It should be understood that, in this embodiment of the present disclosure, the processor 801 and the transceiver 804 can implement the processes implemented by the network side device in the foregoing method embodiment. To avoid repetition, details are not described herein again.

An embodiment of the present disclosure further provides a computer-readable storage medium. The computer-readable storage medium stores a computer program, and when the computer program is executed by a processor, the processes of the foregoing measurement method embodiment are implemented and a same technical effect can be achieved. To avoid repetition, details are not described herein again. The computer-readable storage medium includes a Read-only Memory (ROM), a Random Access Memory (RAM), a magnetic disk, or an optical disc.

It can be understood that the embodiments described in the present disclosure may be implemented by hardware, software, firmware, middleware, microcode, or a combination thereof. For hardware implementation, a module, a unit, a submodule, a subunit, or the like may be implemented in one or more Application Specific Integrated Circuits (ASIC), Digital Signal Processing (DSP), DSP Device (DSPD), Programmable Logic Device (PLD), Field-Programmable Gate Array (FPGA), general purpose processors, controllers, microcontrollers, microprocessors, or other electronic units or a combination thereof used to perform the functions in this application.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (for example, a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A measurement method, performed by a terminal device, comprising:
   when at least two specific transmission nodes including a first specific transmission node and a second specific transmission node are configured for a first serving frequency of the terminal device, performing system frame number and frame timing difference (SFTD) measurement according to a first measurement parameter to obtain an SFTD measurement result, comprising:
   measuring a first SFTD value between the first specific transmission node and a first network node, and measuring a first timing difference between the first specific transmission node and the second specific transmission node;
   calculating a second SFTD value between the second specific transmission node and the first network node according to the first SFTD value and the first timing difference; and
   reporting the first SFTD value and the second SFTD value to a network side device, or reporting the first SFTD value, the second SFTD value, and the first timing difference to the network side device,
   wherein the first measurement parameter is used to instruct to perform at least one of the following: measuring an SFTD value between a specific transmission node configured for the first serving frequency and the first network node, or measuring a timing difference between different specific transmission nodes configured for the first serving frequency;
   the first network node is configured for a second serving frequency, the second serving frequency comprises at least one of a neighboring serving frequency of the first serving frequency or a third serving frequency, and the third serving frequency is a serving frequency other than the first serving frequency in at least two serving frequencies of the terminal device; and
   both the SFTD value and the timing difference comprise at least one of a system frame number difference or a frame boundary difference.

2. The measurement method according to claim 1, further comprising:
   reporting the first SFTD value and the first timing difference to the network side device.

3. The measurement method according to claim 1, wherein a specific transmission node of a fourth serving frequency is configured by the network side device or predefined by a protocol, and the fourth serving frequency comprises at least one of the first serving frequency or the second serving frequency.

4. The measurement method according to claim 3, wherein when the specific transmission node of the fourth serving frequency is predefined by the protocol, the specific transmission node of the fourth serving frequency comprises one of the following:
   all transmission nodes of the fourth serving frequency;
   a transmission node in an active state in all the transmission nodes of the fourth serving frequency; or
   a transmission node of a first type in all the transmission nodes of the fourth serving frequency, wherein the transmission node of the first type comprises at least one of a primary transmission node, an initial transmission node, or a default transmission node.

5. The measurement method according to claim 1, wherein transmission node physical identifiers of different transmission nodes in the at least two specific transmission nodes are different,
   wherein the transmission node physical identifier comprises at least one of the following:
   a physical serving frequency identifier;
   a reference signal identifier;
   a port number identifier corresponding to a reference signal: or
   a resource location identifier of a control channel.

6. The measurement method according to claim 1, further comprising:
   reporting the SFTD measurement result and first information to the network side device,
   wherein the first information comprises at least one of the following:
   a transmission node physical identifier of a third specific transmission node;
   a serving frequency identifier of a serving frequency corresponding to the third specific transmission node;
   a type identifier of the serving frequency corresponding to the third specific transmission node: or
   a measurement result of at least one of a reference signal received power (RSRP), reference signal received quality (RSRQ), or a received signal strength indicator (RSSI) of the third specific transmission node,
   wherein the third specific transmission node comprises at least one of a specific transmission node of the first serving frequency or a specific transmission node of the second serving frequency.

7. The measurement method according to claim 1, wherein the first measurement parameter is configured by the network side device or predefined by a protocol.

8. The measurement method according to claim 1, wherein one of the first serving frequency or the third serving frequency is a primary cell, and the other is a primary secondary cell.

9. The measurement method according to claim 8, wherein when one of the first serving frequency or the third serving frequency is a primary cell, and the other is a primary secondary cell, the first measurement parameter is further used to instruct to perform at least one of the following:
   measuring an SFTD value between a specific transmission node of the third serving frequency and the first serving frequency;
   measuring an SFTD value between the specific transmission node of the third serving frequency and a neighboring serving frequency of the third serving frequency; or measuring a timing difference between different specific transmission nodes of the third serving frequency.

10. A terminal device, comprising:
a memory storing a computer program, and
a processor coupled to the memory and configured to execute the computer program to perform operations comprising:
when at least two specific transmission nodes including a first specific transmission node and a second specific transmission node are configured for a first serving frequency of the terminal device, performing system frame number and frame timing difference (SFTD) measurement according to a first measurement parameter to obtain an SFTD measurement result, comprising:
measuring a first SFTD value between the first specific transmission node and a first network node, and measuring a first timing difference between the first specific transmission node and the second specific transmission node;
calculating a second SFTD value between the second specific transmission node and the first network node according to the first SFTD value and the first timing difference; and
reporting the first SFTD value and the second SFTD value to a network side device, or reporting the first SFTD value, the second SFTD value, and the first timing difference to the network side device,
wherein the first measurement parameter is used to instruct to perform at least one of the following: measuring an SFTD value between a specific transmission node configured for the first serving frequency and the first network node, or measuring a timing difference between different specific transmission nodes configured for the first serving frequency;
the first network node is configured for a second serving frequency, the second serving frequency comprises at least one of a neighboring serving frequency of the first serving frequency or a third serving frequency, and the third serving frequency is a serving frequency other than the first serving frequency in at least two serving frequencies of the terminal device; and
both the SFTD value and the timing difference comprise at least one of a system frame number difference or a frame boundary difference.

11. The terminal device according to claim 10, further comprising:
reporting the first SFTD value and the first timing difference to the network side device.

12. The terminal device according to claim 10, wherein a specific transmission node of a fourth serving frequency is configured by the network side device or predefined by a protocol, and the fourth serving frequency comprises at least one of the first serving frequency or the second serving frequency.

13. The terminal device according to claim 12, wherein when the specific transmission node of the fourth serving frequency is predefined by the protocol, the specific transmission node of the fourth serving frequency comprises one of the following:
all transmission nodes of the fourth serving frequency;
a transmission node in an active state in all the transmission nodes of the fourth serving frequency; or
a transmission node of a first type in all the transmission nodes of the fourth serving frequency, wherein the transmission node of the first type comprises at least one of a primary transmission node, an initial transmission node, or a default transmission node.

14. The terminal device according to claim 10, wherein transmission node physical identifiers of different transmission nodes in the at least two specific transmission nodes are different,
wherein the transmission node physical identifier comprises at least one of the following:
a physical serving frequency identifier;
a reference signal identifier;
a port number identifier corresponding to a reference signal; or
a resource location identifier of a control channel.

15. The terminal device according to claim 10, further comprising:
reporting the SFTD measurement result and first information to the network side device,
wherein the first information comprises at least one of the following:
a transmission node physical identifier of a third specific transmission node;
a serving frequency identifier of a serving frequency corresponding to the third specific transmission node;
a type identifier of the serving frequency corresponding to the third specific transmission node; or
a measurement result of at least one of a reference signal received power (RSRP), reference signal received quality (RSRQ), or a received signal strength indicator (RSSI) of the third specific transmission node,
wherein the third specific transmission node comprises at least one of a specific transmission node of the first serving frequency or a specific transmission node of the second serving frequency.

16. A non-transitory computer-readable storage medium, storing a computer program, wherein the computer program, when executed by a processor of a terminal device, causes the processor to perform operations comprising:
when at least two specific transmission nodes including a first specific transmission node and a second specific transmission node are configured for a first serving frequency of the terminal device, performing system frame number and frame timing difference (SFTD) measurement according to a first measurement parameter to obtain an SFTD measurement result, comprising:
measuring a first SFTD value between the first specific transmission node and a first network node, and measuring a first timing difference between the first specific transmission node and the second specific transmission node;
calculating a second SFTD value between the second specific transmission node and the first network node according to the first SFTD value and the first timing difference; and
reporting the first SFTD value and the second SFTD value to a network side device, or reporting the first SFTD value, the second SFTD value, and the first timing difference to the network side device,
wherein the first measurement parameter is used to instruct to perform at least one of the following: measuring an SFTD value between a specific transmission node configured for the first serving frequency and the first network node, or measuring a timing difference between different specific transmission nodes configured for the first serving frequency;

the first network node is configured for a second serving frequency, the second serving frequency comprises at least one of a neighboring serving frequency of the first serving frequency or a third serving frequency, and the third serving frequency is a serving frequency other than the first serving frequency in at least two serving frequencies of the terminal device; and both the SFTD value and the timing difference comprise at least one of a system frame number difference or a frame boundary difference.

\* \* \* \* \*